May 15, 1951     S. H. STUPAKOFF     2,552,653
ELECTRICAL CONDENSER

Filed Aug. 23, 1944

INVENTOR
Semon H. Stupakoff
by his attorneys
Christy, Parmelee & Strickland

Patented May 15, 1951

2,552,653

UNITED STATES PATENT OFFICE 2,552,653

ELECTRICAL CONDENSER

Semon H. Stupakoff, Latrobe, Pa., assignor to Stupakoff Ceramic & Manufacturing Co., Latrobe, Pa., a corporation of Pennsylvania Application August 23, 1944, Serial No. 550,715

1 Claim. (Cl. 175—41)

This invention pertains to electrical condensers and their manufacture, and is for an improved condenser construction and a novel method of making the same. The invention is particularly applicable for use in small high-capacity condensers which have to have a high degree of accuracy under widely varying climatic and atmospheric conditions. While the invention is not limited to small condensers, it is particularly applicable to condensers which are required to be used in a restricted space, and which therefore have to be physically small.

At the present time, high capacity condensers are widely required in the field of radio and like equipment. Difficulty has heretofore been encountered in making the condensers sufficiently compact, and at the same time immune to atmospheric conditions or changes in atmospheric conditions.

According to the present invention, the electrical elements of the condenser are received within and held together by glass or glass and ceramic material, the glass being fused to the metal parts to form a hermetic seal, the glass or glass and ceramic serving to hold the parts together and in proper relation, and also providing a moisture-proof enclosure. The glass and the metal parts which it contacts may have their coefficients of thermal expansion matched, or so nearly matched that changes in temperature, brought about either by the sealing of the condenser in its manufacture, or by subsequent changes of temperature encountered in use, will not cause the glass to break or crack.

My invention may be more fully understood by reference to the accompanying drawings, in which.

Figure 1:
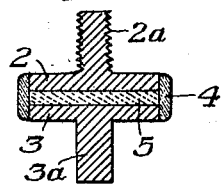
Fig. 1 illustrates a longitudinal section through a condenser embodying my invention.

Referring first to Fig. 1, the condenser therein illustrated may be many times the actual size of the completed condenser. The condensers, for example, may be small enough so that several of them may be placed on the base of a radio tube, one on each of the contact pins of the tube. As above indicated, however, the invention while primarily applicable to small structures is not limited as to size. The condenser as disclosed in Fig. 1 comprises two metal discs or plates which may be either circular, rectangular, or any other convenient shape, these being designated 2 and 3 respectively. The plate 2 has a threaded outwardly extending projection 2a and the plate 3 has a similar projection 3a. In the drawing, 2a is illustrated as being threaded, and 3a is designated as smooth, but this is merely a matter of choice, and both may be threaded or smooth, depending upon whether the projections are to be soldered into the circuit or whether terminals utilizing nuts are to be employed. Each of the plates has a flat inner face. Sandwiched between the two faces of the discs, and of coextensive area therewith, is a body of dielectric material. Preferably the dielectric material is formed of titanium dioxide or like ceramic having an inherent high dielectric property. The parts are held together by a glass shell or sleeve 4, which fits snugly or tightly about the same assembly, and the glass is of a character which wets the metal bodies 2 and 3 and will seal itself thereto. Typically the metal elements 2 and 3 may be of a metal such as that sold under the trade-mark "Kovar," and the glass is one of several well-known boro-silicate glasses, the coefficient of expansion of which is matched or substantially matched to that of the "Kovar." The "Kovar" metal has a property that glass will wet or adhere to the surface thereof when the glass is fused in contact with it.

The assembly is made either by fusing glass about the assembly or by fitting a preformed sleeve about the assembly and then heating it to a fusing temperature. In either event the glass seals to the metal elements 2, forming a hermetic closure about the dielectric substance 5. It serves not only as a hermetic seal, but as a means for holding the parts firmly and fixedly together in a permanent assembly.

Figure 2:
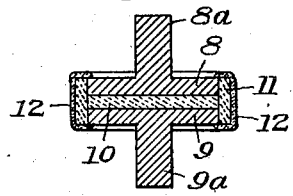
Fig. 2 is a view similar to Fig. 1 of a slightly modified form, wherein a combination of ceramic and glass is used.
Figure 5:
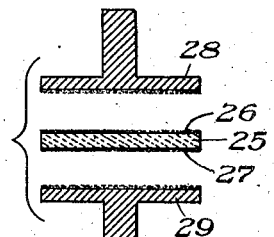
Fig. 5 is a view of a modification which is preferably used in high grade constructions, the view showing a side elevation, but not detached from the several parts constituting the condenser.

In the modification shown in Fig. 2, the construction is substantially the same as that shown in Fig. 1, except that the parts are fitted within a ceramic sleeve and the boro-silicate glass is applied at each end of the sleeve and over the surface of the sleeve to render it impervious to air. In Fig. 2 the two plate elements are designated 8 and 9. Each is shown as having an outwardly extending stem portion 8a and 9a respectively, and these may or may not be threaded as indicated in Fig. 1. Sandwiched between the two conducting plates 8 and 9 is a disc of high dielectric material 10, this preferably being, as heretofore indicated, a titanium dioxide body. The disc is coextensive with the area of the plates 8 and 9. Fitted about the periphery of the assembled structure comprising the members 8 and 9 and the intervening disc 10 is a refractory ceramic ring 11. A coating of glass 12 is over this ceramic ring and is fused to the metal 8 at each end of the ring. Here again the coefficient of thermal expansion of the glass is preferably the same as that of the metal, or sufficiently closely matched so that the glass may be fused to the metal and will not break upon cooling, and will subsequently withstand breakage under any changes of temperature to which the condenser is normally subject.

Figure 3:
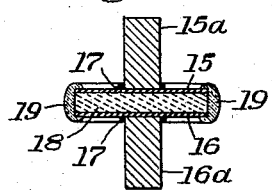
Fig. 3 is a view similar to Fig. 1 showing still a further slightly modified form.

In Figs. 1 and 2 the plates are illustrated as having integral stems. In Fig. 3 the plates of the condenser, designated 15 and 16, are thin sheet metal. Connectors 15a and 16a respectively are soldered or otherwise secured to the sheet metal plates, the solder or other connecting material being designated 17. Interposed between the plates is a body of dielectric material 18. A bead 19 of boro-silicate glass, or other glass that will wet the metal plates 15 and 16 and adhere thereto, and which preferably has its coefficient of expansion properly adjusted to match that of the metal 15 and 16, surrounds the periphery of the assembly and connects the two plates permanently together, excluding at the same time, atmospheric moisture. With this arrangement the connector pins 15a and 16a do not have to be of the same metal as the plates 15 and 16.

Figure 4:
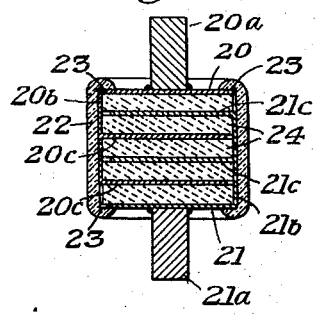
Fig. 4 is a view similar to Fig. 1, showing a multiplate condenser constructed in accordance with this invention.

Referring to Fig. 4, the structure is the same as that previously described, except that the condenser is a multiplate condenser. There are two end plates 20 and 21. Each of these plates is provided with a connector portion or stem 20a and 21a, respectively. The plate 20 is provided with a conductor strip 20b which in turn supports the plates 20c. Likewise the plate 21 has a conductor strip 21b to which are connected plates 21c. The plates 20c and 21c are alternately arranged and sandwiched between each two conducting plates as a layer or disc of insulating material, preferably of the type herein above described. Surrounding the assembly is a glass sleeve 22 which is fused at 23 to the plates 20 and 21. The coefficients of thermal expansion of the plates 20 and 21 and the coefficient of expansion of the glass at 23 is preferably matched or closely matched so that the glass can be fused to the assembly to make a fixed hermetically sealed condenser.

In the foregoing embodiments of the invention, the metal elements are indicated as themselves constituting the plate surfaces of the condenser. This type of construction may not give as high uniformity of results as may be desired. Different condensers made at the same time and by the same process might, if close tolerances were imposed, vary beyond a permissive range. Where a high degree of uniformity is desired, the dielectric body 25 may be metallized on each surface as indicated at 26 and 27. This metallizing may be done by depositing a film of metal directly on the dielectric body. The most convenient manner accomplishing this is to paint the surfaces of the ceramic body 25 with a paint that will form a continuous metal film. Silver paint may be used, but preferably a metal having a higher melting point, such for example, as platinum paint. The metal plates, formed of "Kovar" or other appropriate metal, and designated 28 and 29, may be coated with solder. The two metal elements and the metallized ceramic body are then pressed together and heated so that the plates 28 will be soldered to the metal surfaces 26 and 27. The metal surfaces 26 and 27 will constitute the actual plates of the condenser. There will be no possibility of an intervening complete or partial film of air between the metal and the ceramic. Because of the absence of air or other substances between the metalized surfaces and the dielectric material, the full benefit of the high dielectric ceramic body is obtained and the condenser has a high capacity and low loss factor as well as improved uniformity.

After the soldering operation has been completed, a glass bead, such as shown in Fig. 1 or 3, is formed around the periphery of the assembly to hermetically encase the ceramic dielectric body 25 and firmly unite the two metal plates 28 and 29. In a construction such as this, the metal plates 28 and 29 serve to make contact with the metal films 26 and 27, and the metal films 26 and 27 are the actual charge carrying plates of the condenser. The metallizing of the ceramic may also be accomplished in other ways, as by spraying the metal onto the ceramic, and thereafter smoothing it off if necessary.

The invention provides an extremely compact, sturdy, and economical condenser which is hermetically sealed against atmospheric conditions. The condenser and the method of making it is further unique in that the material that forms the hermetic seal is formed or placed directly about and in contact with the dielectric material and is fused to the condenser plates themselves, avoiding the necessity of embedding the condenser in wax or other embedding material. The term "glass" is used herein in a general sense to include any glass like ceramic compound which may be caused to fuse and adhere to the metal plates at temperatures below that at which the metal plates will be detrimentally effected.

While I have shown and described certain specific embodiments of my invention, it will be understood that this is by way of illustration and that various changes and modifications are contemplated and are within the scope of the appended claim.

I claim:

A hermetically sealed condenser comprising a high capacity condenser assembly of a pair of spaced terminal conductor elements respectively including parts in conducting relation therewith and providing opposed charge-collecting areas, and a solid ceramic body of high dielectric material completely filling the space between said collecting areas and in intimate contact therewith, and an envelope of glass embracing the assembly and having portions at its ends respectively fused to one of said conductor elements, said glass envelope and conductor elements cooperating to form a hermetic enclosure for said dielectric body and respectively having thermal coefficients of expansion which are substantially matched.

SEMON H. STUPAKOFF.

(References on following page)

REFERENCES CITED

The following references are of record in the file of this patent:

UNITED STATES PATENTS

| Number | Name | Date |
|---|---|---|
| 887,598 | Delloye | May 12, 1908 |
| 1,407,061 | Gray | Feb. 21, 1922 |
| 1,479,315 | Pickard | Jan. 1, 1924 |
| 1,591,177 | Minge | July 6, 1926 |
| 1,717,154 | Hoover | June 11, 1929 |
| 2,148,607 | De Lange | Feb. 28, 1939 |
| 2,157,715 | Meggenhofen | May 9, 1939 |
| 2,159,793 | Grundmann | May 23, 1939 |
| 2,163,407 | Pulfrich | June 20, 1939 |
| 2,177,498 | Payne | Oct. 24, 1939 |
| 2,177,502 | Stack | Oct. 24, 1939 |
| 2,228,352 | Hopfield | Jan. 14, 1941 |
| 2,238,031 | Brennan | Apr. 15, 1941 |
| 2,251,540 | Bushbeck et al. | Aug. 5, 1941 |
| 2,315,199 | Gonningen | Mar. 30, 1943 |
| 2,370,082 | Slepian | Feb. 20, 1945 |
| 2,436,208 | Dressel | Feb. 17, 1948 |

FOREIGN PATENTS

| Number | Country | Date |
|---|---|---|
| 601,961 | Germany | Aug. 28, 1934 |